United States Patent
Minami

(10) Patent No.: US 10,449,803 B2
(45) Date of Patent: Oct. 22, 2019

(54) PNEUMATIC TIRE

(71) Applicant: The Yokohama Rubber Co., LTD., Minato-ku, Tokyo (JP)

(72) Inventor: Yuji Minami, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 297 days.

(21) Appl. No.: 15/319,746

(22) PCT Filed: Jun. 12, 2015

(86) PCT No.: PCT/JP2015/066994
§ 371 (c)(1),
(2) Date: Dec. 16, 2016

(87) PCT Pub. No.: WO2015/194469
PCT Pub. Date: Dec. 23, 2015

(65) Prior Publication Data
US 2017/0136818 A1 May 18, 2017

(30) Foreign Application Priority Data
Jun. 17, 2014 (JP) .................. 2014-124715

(51) Int. Cl.
*B60C 3/04* (2006.01)
*B60C 17/04* (2006.01)
(Continued)

(52) U.S. Cl.
CPC .............. *B60C 3/04* (2013.01); *B60C 9/0042* (2013.01); *B60C 11/0083* (2013.01);
(Continued)

(58) Field of Classification Search
CPC .......... B60C 3/00; B60C 3/04; B60C 17/0009
See application file for complete search history.

(56) References Cited

U.S. PATENT DOCUMENTS 4,282,918 A * 8/1981 Tomoda .................... B60C 3/04
152/454
5,058,646 A 10/1991 Kajikawa et al.
(Continued)

FOREIGN PATENT DOCUMENTS

CN 103717406 4/2014
EP 323895 * 7/1989
(Continued)

OTHER PUBLICATIONS

International Search Report for International Application No. PCT/JP2015/066994 dated Sep. 1, 2015, 4 pages, Japan.

*Primary Examiner* — Justin R Fischer
(74) *Attorney, Agent, or Firm* — Thorpe North & Western

(57) ABSTRACT

Provided is a pneumatic tire where a total width (SW) and an outer diameter (OD) satisfy the relationship SW/OD≤0.3; an inner diameter (ID) and an outer diameter (OD) satisfy the relationship ID/OD≥0.7; as viewed in a tire meridional cross section, an area (X1) (mm$^2$) of a first region (R1) and a periphery length (Y1) (mm) of an inner peripheral surface of the first region (R1) have a ratio X1/Y1 of 12 or greater and 30 or less; and an area X2 (mm$^2$) of a second region (R2) and a periphery length (Y2) (mm) of an inner peripheral surface of the second region (R2) have a ratio X2/Y2 of 10 or greater and 15 or less.

8 Claims, 2 Drawing Sheets

(51) Int. Cl.
- *B60C 9/00* (2006.01)
- *B60C 11/00* (2006.01)
- *B60C 17/00* (2006.01)
- *B60C 15/06* (2006.01)
- *B60C 13/00* (2006.01)

(52) U.S. Cl.
CPC .. *B60C 17/0009* (2013.01); *B60C 2009/0071* (2013.01); *B60C 2013/007* (2013.01); *B60C 2015/061* (2013.01)

(56) References Cited

U.S. PATENT DOCUMENTS

| | | |
|---|---|---|
| 6,631,748 B1 * | 10/2003 | Nguyen .................... B60C 9/08 152/516 |
| 2005/0006017 A1 | 1/2005 | Cottrell et al. |
| 2012/0103488 A1 | 5/2012 | Kubota |
| 2013/0042953 A1 | 2/2013 | Kuwayama |
| 2014/0290816 A1 | 10/2014 | Hatanaka et al. |
| 2014/0332136 A1 | 11/2014 | Yamada |
| 2015/0202929 A1 | 7/2015 | Horiuchi |
| 2016/0001604 A1 | 1/2016 | Minami et al. |

FOREIGN PATENT DOCUMENTS

| | | |
|---|---|---|
| JP | S60-234008 | 11/1985 |
| JP | H02-147417 | 6/1990 |
| JP | H05-254310 | 10/1993 |
| JP | 2002-301912 | 10/2002 |
| JP | 2004-510627 | 4/2004 |
| JP | 2012-091738 | 5/2012 |
| JP | 5360333 | 12/2013 |
| JP | 2014-054967 | 3/2014 |
| WO | WO 2002/30687 | 4/2002 |
| WO | WO 2011/135774 | 11/2011 |
| WO | WO 2013/014949 | 1/2013 |
| WO | WO 2013/094147 | 6/2013 |
| WO | WO 2014/042035 | 3/2014 |
| WO | WO 2014/128966 | 8/2014 |

* cited by examiner

PNEUMATIC TIRE

TECHNICAL FIELD

The present technology relates to a pneumatic tire with improved performance such as fuel economy performance.

BACKGROUND ART

There have been previous proposals for a pneumatic tire capable of reducing fuel consumption (See International Patent Application Publication No. WO/2011/135774 for example).

In the technology disclosed in International Patent Application Publication No. WO/2011/135774, the air resistance on the periphery of a tire is reduced by having a tire cross-section width W and outer diameter L with a ratio W/L of 0.25 or less, and reducing the tire front projected area (referring to the projected area of a pneumatic tire viewed from the rolling direction).

Recently, there has been a demand for the development of a pneumatic tire capable of demonstrating a high degree of performance with regards to steering stability performance and load durability, as well as fuel economy performance. However, achieving all of these performance capabilities in a well-balanced manner simply by controlling the ratio W/L remains unknown.

SUMMARY

The present technology provides a pneumatic tire with fuel economy performance, steering stability performance and load durability improved in a well-balanced manner.

A pneumatic tire according to the present technology has a carcass layer toroidally bridging a pair of bead portions and a tread portion via a pair of sidewall portions; a total width SW and an outer diameter OD satisfying the relationship SW/OD≤0.3; and an inner diameter ID and the outer diameter OD satisfying the relationship ID/OD≥0.7.

In a tire meridian cross-section, on each side in the tire width direction with the tire equatorial plane in-between, an imaginary pair of first boundary lines passing through the intersection of an extension line of a shoulder arc and an extension line of a side arc and perpendicular to the tire inner circumferential surface, and an imaginary pair of second boundary lines passing through the rim checking line and perpendicular to the tire inner circumferential surface; regions between the first boundary lines and the second boundary lines being respective first regions, and regions further inside from the second boundary lines in the tire radial direction being respective second regions.

The area X1 (mm$^2$) of the first region and the periphery length Y1 (mm) of the inner circumferential surface of the first region have a ratio X1/Y1 of 12 or greater and 30 or less; and The area X2 (mm$^2$) of the second region and the periphery length Y2 (mm) of the inner circumferential surface of the second region have a ratio X2/Y2 of 10 or greater and 15 or less.

In a pneumatic tire according to the present technology, the relationship of total width SW and outer diameter OD, the relationship of inner diameter ID and outer diameter OD, and the shape of prescribed regions in a tire meridian cross-section are defined.

As a result, a pneumatic tire according to the present technology can improve fuel economy performance, steering stability performance, and load durability in a well-balanced manner.

DETAILED DESCRIPTION

Embodiments of the pneumatic tire according to the present technology (including a Basic Embodiment and Additional Embodiments 1 to 8) will now be described based on the drawings.

Note that the present technology is not limited to these embodiments.

The constituents of the embodiments include constituents that can be easily replaced by those skilled in the art and constituents substantially the same as the constituents of the embodiments.

In addition, the various modes included in these embodiments can be combined as desired within the scope of obviousness by a person skilled in the art.

[Basic Embodiment]

A basic embodiment of the pneumatic tire according to the present technology will now be described.

In the following description, "tire radial direction" refers to a direction orthogonal to the axis of rotation of a pneumatic tire; "inside in the tire radial direction" refers to a side that is near to an axis of rotation in the tire radial direction; and "outside in the tire radial direction" refers to a side that is far from the axis of rotation in the tire radial direction.

The "tire circumferential direction" refers to a circumferential direction with the axis of rotation as the center axis.

Furthermore, "tire width direction" refers to a direction parallel to the axis of rotation; "inside in the tire width direction" refers to a side that is near to a tire equatorial plane CL (tire equatorial line) in the tire width direction; and "outside in the tire width direction" refers to a side that is far from the tire equatorial plane CL (tire equatorial line) in the tire width direction.

Note that "tire equatorial plane CL" (tire equatorial line) refers to a plane (line) that is orthogonal to the axis of rotation of the pneumatic tire and that passes through the center of the width of the pneumatic tire.

In addition, specifications included in the present embodiment (for example, rim size, prescribed air pressure, applied load) conform to international standards set by the International Organization for Standardization (ISO).

However, if there is no ISO standard, specifications shall conform to Japanese Industrial Standards (JIS).

In addition, if there is an ISO standard, but JIS has its own specification other than those of ISO, specifications shall conform to either an ISO or a JIS standard.

Figure 1:
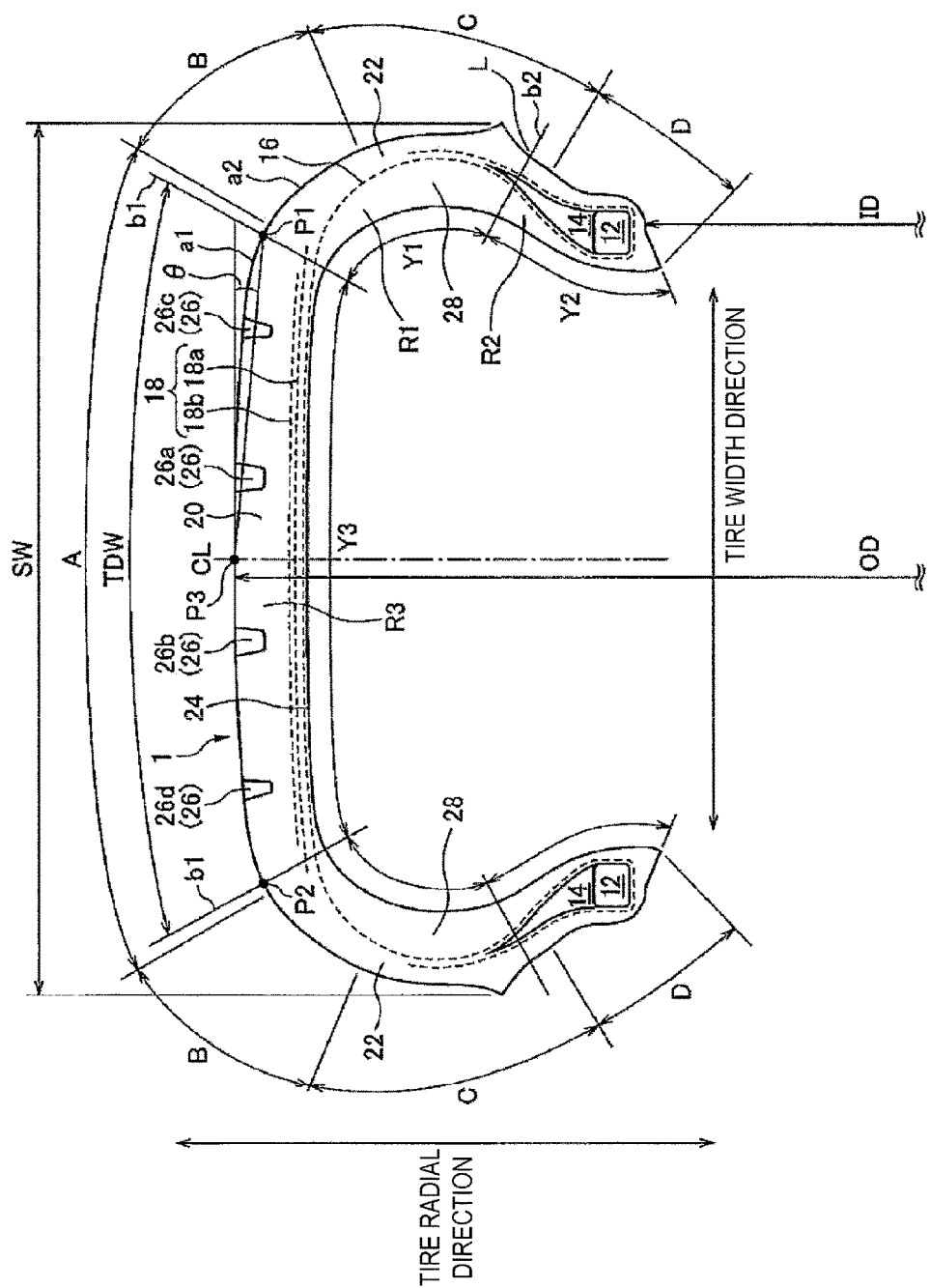
FIG. 1 is a tire meridian cross-sectional view of a pneumatic tire according to an embodiment of the present technology.

FIG. 1 is a tire meridian cross-sectional view of a pneumatic tire according to an embodiment of the present technology illustrating the region between the tread portion and bead portions.

Namely, in the pneumatic tire illustrated in the drawing, pairs of shoulder portions B, B, sidewall portions C, C, and bead portions D, D are continuously formed with a tread portion A at the center.

Thus, the portions from the tread portion A to the bead portions D, D respectively extend continuously in the tire circumferential direction and the pneumatic tire is formed with a toroidal shape.

In the example illustrated in FIG. 1, bead cores 12, bead fillers 14, a carcass layer 16, a belt layer 18, tread rubber 20, a pair of sidewall rubbers 22, 22 and an inner liner 24 are arranged as components of a pneumatic tire 1.

The bead cores 12, for example, have structures circularly winding bead wire in the tire circumferential direction, and the bead filler 14 disposed outside in the tire radial direction of the bead cores 12 is composed of a rubber material harder than other rubber material in order to achieve superior steering stability performance.

The carcass layer 16 is a member bridged between bead cores 12, 12 on both sides in the tire width direction across the portions, D, C, B, A, B, C, D and forms the framework of the tire.

Furthermore, although the carcass layer 16 illustrated in FIG. 1 is configured with a single carcass, the present embodiment is not particularly limited, and the carcass layer 16 may be configured with a plurality of carcasses.

Furthermore, in the present embodiment, the fineness of the carcass cord may be 1400 dtex/2 or greater and 2000 dtex/2 or less, and preferably 1440 dtex/2 or greater and 1860 dtex/2 or less.

In addition, a cord count of the carcass cords per 50 mm in the tire width direction may be 40 or greater and 50 or less.

The belt layer 18 is a member disposed outside in the tire radial direction of the carcass layer 16, strongly tightens the carcass layer 16, and increases the rigidity of the tread portion A.

The belt layer 18 is configured with a plurality of belts (two belts 18a, 18b in the example illustrated in FIG. 1) formed in succession from the inside to the outside in the tire radial direction.

The belts 18a, 18b have a structure in which belt cords mutually intersect.

The tread rubber 20 is a tire outer covering member on the tread portion A that mainly prevents the carcass layer 16 and belt layer 18 from wear and damage.

The sidewall rubbers 22 are tire outer covering members disposed on the outside in the tire width direction of the tread rubber 20, in the regions from the shoulders B to the sidewall portions C, and are disposed on the outside in the tire radial direction or the outside in the tire width direction of the carcass layer 16.

During tire travel, the sidewall rubbers 22 withstand repeated bending deformation, protect the carcass layer 16 from external force, and prevent damage therefrom.

The inner liner 24 is a band-shaped rubber sheet member disposed on the tire inner circumferential surface that covers the carcass layer 16, preventing oxidation due to exposure of the carcass layer 16 and leak of the air filled in the tire.

In a pneumatic tire 1 according to the present embodiment providing the above-described components 12, 14, 16, 18, 20, 22, 24, the vehicle mounting direction may be specified or not specified.

In addition, main grooves are provided on the surface of the tread portion A on the pneumatic tire 1 illustrated in FIG. 1 (tread surface).

Here, main grooves refer to grooves of width of 3 mm or greater and depth of 2.5 mm or greater.

In addition, the above-described main grooves includes main grooves extending in any direction, which define various tread patterns formed on the tread surface.

Namely, the above-described main grooves may be main grooves extending in the tire circumferential direction (hereinafter, sometimes referred to as "circumferential main grooves"), or main grooves inclined in the tire circumferential direction (including main grooves extending in the tire width direction, hereinafter, referred to as "inclined main grooves").

In addition, if the above-mentioned main grooves are inclined main grooves, naturally, such grooves include main grooves for which at least one end is connected to circumferential main grooves and main grooves that are not connected.

Furthermore, four main grooves 26a, 26b, 26c and 26d are illustrated in FIG. 1 as such main grooves.

Under such a premise, in the present embodiment, total width SW, outer diameter OD and inner diameter ID are hereby defined as follows.

Namely, the total width SW (see FIG. 1) is the maximum length of a pneumatic tire 1 in the tire width direction when mounted on a rim and filled to a prescribed air pressure under unloaded state, including design components formed on the outside surface of the sidewall portions C.

"Outer diameter OD" (see FIG. 1) is the maximum length in the tire radial direction when a pneumatic tire 1 is mounted on a rim.

"Inner diameter ID" (see FIG. 1) refers to a length that is a length normally defined as a rim diameter minus the thickness of the rim.

In the present embodiment, the units of total width SW, outer diameter OD and inner diameter ID are all in mm.

Based on these definitions, in a pneumatic tire 1 according to the present embodiment, the total width SW and the outer diameter OD satisfy the relationship SW/OD≤0.3, and the inner diameter ID and the outer diameter OD satisfy the relationship ID/OD≥0.7.

Next, in the present embodiment, as illustrated in FIG. 1, in a tire meridian cross-section, on each side in the tire width direction with the tire equatorial plane CL in-between, an imaginary pair of first boundary lines b1 passing through the intersection of an extension line of a shoulder arc a1 and an extension line of a side arc a2 and perpendicular to the tire inner circumferential surface, and an imaginary pair of second boundary lines b2 passing through the rim checking line L and perpendicular to the tire inner circumferential surface; regions between the first boundary lines b1 and the second boundary lines b2 being respective first regions R1, and regions further inside from the second boundary lines b2 in the tire radial direction being respective second regions R2.

Here, the shoulder arc a1 means an arc describing the contour of the road contact surface of the land portion disposed on the outermost side in the tire width direction of the tread portion A, and the side arcs a2 mean arcs describing the contours of the side wall profiles of the land portion disposed on the outermost side in the tire width direction of the tread portion A.

In addition, although not illustrated, in the present embodiment, profile lines on the tire outer circumference of a type, in which other arcs are interposed between the shoulder arc a1 and side arcs a2, are contemplated.

However, the present embodiments includes exceptions in which the other arcs are not present, in which case the shoulder arc a1 and side arcs a2 are adjacent.

Therefore, if the other arcs described above are not present, the intersection of the extension line of the above-described shoulder arc a1 and the extension lines of the side arcs a2 is replaced with the intersection of the shoulder arc a1 and side arcs a2.

Based on these definitions, in a pneumatic tire 1 according to the present embodiment, the area X1 (mm$^2$) of the first regions R1 and the periphery length Y1 (mm) of the inner circumferential surfaces of the first regions R1 have a ratio X1/Y1 of 12 or greater and 30 or less.

In addition, the area X2 (mm$^2$) of the second regions R2 and the periphery length Y2 (mm) of the inner circumferential surfaces of the second regions R2 have a ratio X2/Y2 of 10 or greater and 15 or less.

(Actions and the Like)

In the present embodiment, total width SW and outer diameter OD have a ratio SW/OD of 0.3 or less.

Thereby, it is possible for the total width SW to be sufficiently narrowed relative to the outer diameter OD, reducing the front projected area of a tire. As a result, it is possible to reduce the air resistance of a tire and improve fuel economy performance.

However, normally narrowing the total width SW relative to the outer diameter OD decreases the length of the contact area in the tire width direction. This results in a lack of sufficient cornering power, making it difficult to realize superior steering stability performance.

Therefore, in the present embodiment, the inner diameter ID and outer diameter OD have a ratio ID/OD of 0.7 or greater, reducing the cross-sectional height.

Thereby, it is possible to generate sufficient cornering force when turning a vehicle, and consequently demonstrate superior steering stability performance.

Next, in the present embodiment, as described above, for specific regions (first regions and second regions) with the areas (X1, X2) and inner circumferential surfaces with periphery lengths (Y1, Y2), the ratios (X1/Y1, X2/Y2) thereof are controlled.

The ratio of the surface areas of the specific regions and the periphery lengths of their inner circumferential surfaces, i.e., the value of the surface areas of the specific regions divided by the periphery lengths of the inner circumferential surfaces, is the value indicating the mean value (mean width) of width measured along a direction perpendicular to the extending direction (the longitudinal direction) of those regions.

Thus, this value can serve as an index expressing the rigidity and inflexibility in the direction of deformation of the specific regions during tire rolling.

Normally, if the ratio ID/OD of inner diameter ID and outer diameter OD is increased, it is not possible to adequately secure side regions capable of deformation during tire rolling, making it difficult to realize superior load durability.

However, in the present embodiment, the first regions (second regions) have a ratio X1/Y1 (ratio X2/Y2) of 12 or greater (10 or greater), making it possible to secure sufficient rigidity in the direction of deformation of the first regions (second regions) during tire rolling, and demonstrate superior steering stability performance.

In addition, the first regions (second regions) have a ratio X1/Y1 (ratio X2/Y2) of 12 or greater (10 or greater), making it possible to control the bending of prescribed regions during tire rolling, and demonstrate superior load durability.

On the other hand, the first regions (second regions) have a ratio X1/Y1 (ratio X2/Y2) of 30 or less (15 or less), making it possible to avoid excessive increase in the mean width, limit increase in the tire weight, and consequently demonstrate superior fuel economy performance.

Furthermore, if the ratio X1/Y1 (ratio X2/Y2) is 14 (11) or greater and 28 (14) or less, it is possible to demonstrate these effects to a greater extent.

As shown above, a pneumatic tire according to the present embodiment particularly makes it possible to improve fuel economy performance, steering stability performance, and load durability in a well-balanced manner by properly controlling the relationship between total width SW and outer diameter OD, the relationship between inner diameter ID and outer diameter OD, and the shapes of prescribed regions in a tire meridian cross-section.

Furthermore, as shown above, a pneumatic tire according to the present embodiment can be obtained via ordinary manufacturing steps; i.e., a tire material mixing step, a tire material processing step, a green tire molding step, a vulcanization step, a post-vulcanization inspection step, etc.

When manufacturing a pneumatic tire according to the present technology, green tire molding and vulcanization are performed so that a tire mounted on a rim and filled to a prescribed air pressure after completing the post-vulcanization inspection step satisfies the above-described relationship between total width SW and outer diameter OD, the relationship between inner diameter ID and outer diameter OD, and the shape of prescribed regions in a tire meridian cross-section.

[Additional Embodiments]

Next, descriptions are made of additional embodiments 1 to 8 which can be optionally implemented as opposed to Basic Embodiment of the pneumatic tire according to the present technology described above.

(Additional Embodiment 1)

In the Basic Embodiment, if the region between the first pair of boundary lines b1, b1 illustrated in FIG. 1 is defined as a third region R3, the area X3 (mm$^2$) of the third region R3 and the periphery length Y3 (mm) of the inner circumferential surface of the third region R3 have a ratio X3/Y3 preferably 11 or greater and 15 or less (Additional Embodiment 1).

Here, the value of the area X3 (mm$^2$) of the third region R3 divided by the periphery length Y3 (mm) of the inner circumferential surface is the value indicating the mean value (mean width) of width measured along a direction perpendicular to the extending direction (the tire width direction) of the third region R3.

Thus, it is possible for this value to serve as an index for determining the rigidity in the direction of deformation of the third region R3 during tire rolling, and the maximum depth of grooves arrangeable on the tread portion A.

Under such a viewpoint, the ratio X3/Y3 being 11 or greater makes it possible to ensure an adequate depth of the grooves arranged on the tread portion A, and consequently increase tire drainage performance.

In addition, the ratio X3/Y3 being 15 or less makes it possible to avoid an excessive increase in the thickness of the tread portion, limit tire weight and consequently rolling resistance, and furthermore improve fuel economy performance.

Furthermore, the ratio X3/Y3 being 15 or less makes it possible to limit the thickness of the tread portion, and inhibit collapsing of the land portion during vehicle turning, and therefore further improve steering stability performance.

Furthermore, if the ratio X3/Y3 is 12 or greater and 14 or less, it is possible to demonstrate each of these effects to a greater extent.

(Additional Embodiment 2)

In the Basic Embodiment and an embodiment that combines the Basic Embodiment with Additional Embodiment 1, the ratio X1/Y1 is preferably greater than the ratio X2/Y2 (Additional Embodiment 2).

The ratio X1/Y1 being greater than the ratio X2/Y2 makes it possible to further increase the mean width of the first regions, for which the amount of bending during tire rolling is relatively large.

Thereby, it is possible to inhibit the bending of the sidewall portions C, and consequently further improve the load durability.

(Additional Embodiment 3)

Figure 2:
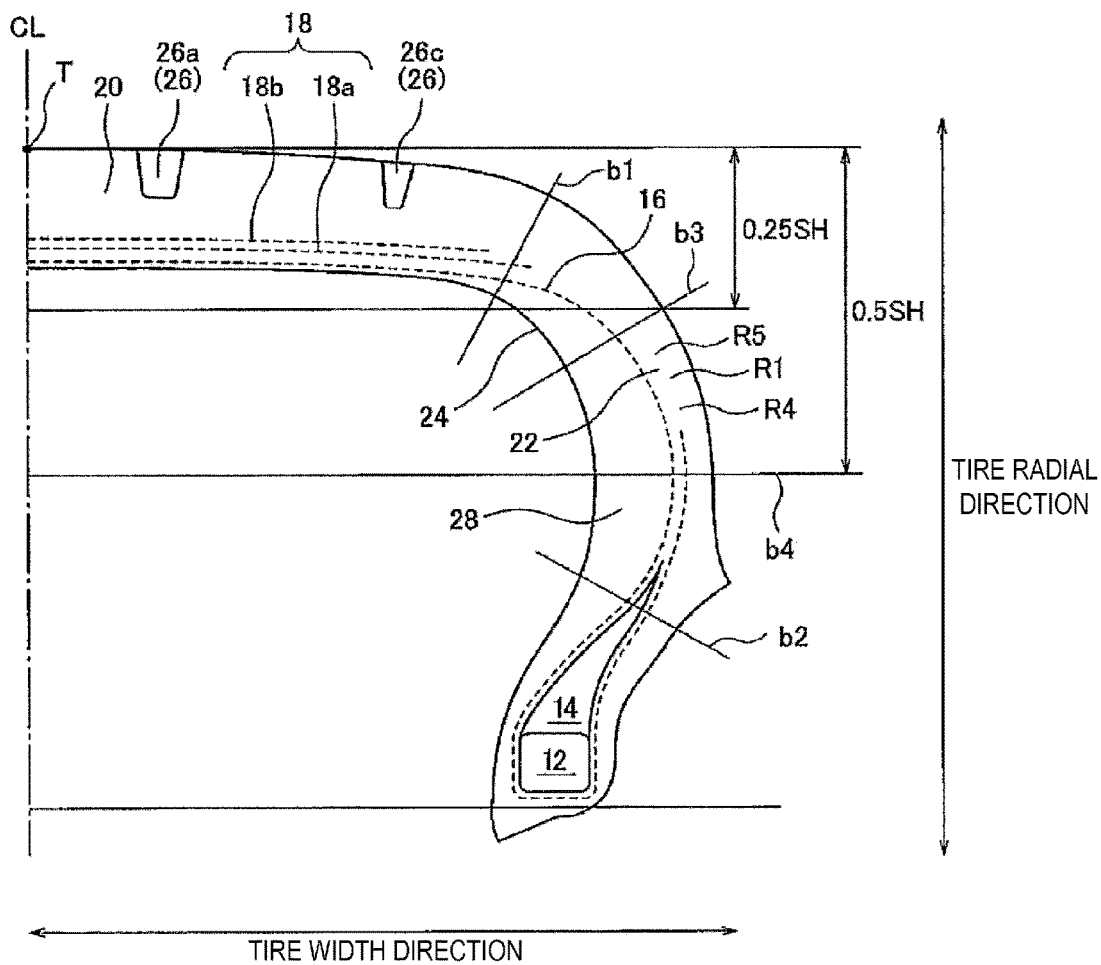
FIG. 2 is an enlarged tire meridian cross-sectional view of one side of the pneumatic tire in the tire width direction illustrated in FIG. 1.

FIG. 2 is an enlarged tire meridian cross-sectional view of one side of the pneumatic tire in the tire width direction illustrated in FIG. 1.

In the Basic Embodiment and an embodiment that combines the Basic Embodiment with Additional Embodiment 1 or 2, as illustrated in FIG. 2, in a tire meridian cross-section, if a tread apex T is defined as the intersection of a profile line of a tire outer circumferential surface and a tire equatorial plane CL, an imaginary pair of third boundary lines b3 orthogonal to the tire inner circumferential surface passes through respective positions on the tire outer circumferential surface at a distance 0.25 times the tire cross-sectional height SH from the tread apex, and each fourth region is defined as a region between the second boundary lines b2 and third boundary lines b3, then a tire maximum thickness position in the first regions R1 is preferably present in the fourth region (Additional Embodiment 3).

Here, "fourth regions R4" refers to sections disposed inside in the tire radial direction, within the first regions R1 specified as regions between the first boundary lines b1 and second boundary lines b2.

In addition, the tire cross-sectional height SH is the value obtained by subtracting the tire inner diameter ID from the tire outer diameter OD, divided by 2.

Furthermore, "tire maximum thickness" refers to the length of the longest line segment that can be drawn orthogonal to the tire inner circumferential surface within the first regions R1.

By making the tire maximum thickness positions being in the first regions R1 within the fourth regions R4, it is possible to increase the thickness of the fourth regions R4, for which the amount of bending is large during tire rolling even within the first regions R1, and further increase the load durability.

(Additional Embodiment 4)

In the Basic Embodiment and an embodiment that combines the Basic Embodiment with at least one of Additional Embodiment 1 to 3, as illustrated in FIG. 2, in a tire meridian cross-section, if a tread apex T is defined as the intersection of a profile line of the tire outer circumferential surface and the tire equatorial plane CL, an imaginary pair of fourth boundary lines b4 orthogonal to the tire inner circumferential surface passes through respective positions on the tire outer circumferential surface at a distance 0.5 times the tire cross-sectional height SH from the tread apex T, and each fifth region is defined as a region between the first boundary lines b1 and fourth boundary lines b4, then a variation of tire thickness in the fifth regions R5 is preferably 2 mm or less (Additional Embodiment 4).

Here, "fifth regions R5" refers to sections disposed outside in the tire radial direction, within the first regions R1 specified as regions between the first boundary lines b1 and second boundary lines b2.

The variation of tire thickness in the fifth regions R5 being 2 mm or less particularly makes it possible to avoid excessively increasing fluctuation in tire thickness in the fifth regions, inhibit localized strain in part of the fifth regions during tire rolling, and consequently further increase load durability.

Furthermore, if the variation of the tire thickness in the fifth regions R5 is 1 mm or less, it is possible to demonstrate these effects to a greater extent.

(Additional Embodiment 5)

In the Basic Embodiment and an embodiment that combines the Basic Embodiment with at least one of Additional Embodiment 1 to 4, as illustrated in FIGS. 1 and 2, in a tire meridian cross-section, crescent-shaped side reinforcing rubber 28 may be arranged inside in the tire width direction of the carcass layer 16 (additional embodiment 5).

Here, side reinforcing rubber 28 is rubber that is greater in hardness compared to sidewall rubber 22, and is normally used in run flat tires.

If crescent-shaped side reinforcing rubber 28 is arranged inside in the tire width direction of the carcass layer 16, it is possible to further reduce deformation of the shoulder portions B and sidewall portions C during tire rolling, and consequently further improve load durability.

Furthermore, if the side reinforcing rubber 28 illustrated in FIGS. 1 and 2 are arranged, even if the tire is punctured and air pressure falls to 100 kPa or lower, the side reinforcing rubber 28 inhibits bending of the tire, making it possible to travel a certain distance at a constant speed.

(Additional Embodiment 6)

In an embodiment that combines the Basic Embodiment with at least Additional Embodiment 5, the loss tangent (tan δ) of the side reinforcing rubber at 60° C. is preferably 0.01 or greater and 0.1 or less (Additional Embodiment 6).

In the present technology, the loss tangent (tan δ) is measured using a viscoelastic spectrometer (manufactured by Toyo Seiki Seisaku-sho, Ltd.) under conditions of frequency 20 Hz, initial strain 10%, dynamic strain ±2%, and temperature 60° C. in accordance with JIS-K6394.

In general, the loss tangent (tan δ) can express an index of energy loss together with so-called loss modulus. In the present embodiment, the loss tangent (tan δ) of the side reinforcing rubber at 60° C. is 0.1 or less, making it possible to suppress heat build-up during tire rolling in the regions from the shoulder portions B to the sidewall portions C.

As a result, it is possible to further reduce rolling resistance and improve fuel economy performance, and limit the wear caused by heat build-up and further improve load durability.

(Additional Embodiment 7)

In an embodiment that combines the Basic Embodiment with at least Additional Embodiment 5, the JIS-A hardness of the side reinforcing rubber at 20° C. is preferably 60 or greater and 80 or less (Additional Embodiment 7).

In the present technology, "JIS hardness" is durometer hardness as measured according to JIS K-6253 using a type A durometer at a temperature of 20° C.

The JIS-A hardness of the reinforced rubber at 20° C. being 60 or greater makes it possible to increase the rigidity in the regions from the shoulder portions B to the sidewall portions C, and suppress deformation during tire rolling.

As a result, it is possible to suppress the wear caused by the improved rigidity, and further improve load durability.

In addition, the JIS-A hardness of the reinforced rubber at 20° C. being 80 or less makes it possible to avoid excessive increase in the rigidity in the regions from the shoulder portions B to the sidewall portions C, and consequently increase ride comfort.

(Additional Embodiment 8)

As illustrated in FIG. 1, reference points P1, P2 are defined as the intersections of the first boundary lines b1 and a profile line of the tire outer circumferential surface on both sides in the tire width direction, and developed tread width (TDW) is defined as the length along the profile line on the tire outer circumferential surface between the two reference points P1, P2.

In addition, as illustrated in FIG. 1, the intersection P3 of the profile line of the tire outer circumferential surface and the tire equatorial plane CL is defined as the tread apex P3, and an angle θ is defined as an angle of the line segments joining the reference points P1 (P2) and tread apex P3 relative to the tire width direction.

Under such a premise, in the Basic Embodiment and an embodiment that combines the Basic Embodiment with at least Additional Embodiment 1, the developed tread width TDW and total width SW have a ratio TDW/SW of 0.8 or greater and less than 1, and the angle θ is preferably 1° or greater and 5° or less (Additional Embodiment 8).

Furthermore, the size of θ illustrated in FIG. 1 is a size shown exaggeratingly in compared to the actual dimension in order to clarify the way of taking the angle θ, and should not be assumed to be the actual size in the present embodiment.

The ratio TDW/SW being 0.8 or greater makes it possible to ensure adequate contact width, facilitate the generation of cornering force, and consequently further improve steering stability performance.

In addition, the ratio TDW/SW being less than 1 makes it possible to realize adequate decreasing effects for rolling resistance, and further improve fuel economy performance.

Next, the angle θ being 1° or greater makes it possible to avoid excessive increase in the contact pressure in the regions on the outside in the tire width direction of the tread portion A illustrated in FIG. 1, and further improve steering stability performance.

Additionally, the angle θ being 5° or less makes it possible to avoid excessive increase in the contact pressure in the region in the middle in the tire width direction of the tread portion A, and further improve steering stability performance.

Furthermore, if the ratio TDW/SW is 0.86 or greater and 0.98 or less, and the angle θ is 2° or greater and 4° or less, it is possible to demonstrate these respective effects to a further greater extent.

EXAMPLES

Pneumatic tires were manufactured according to comparative examples 1 to 2 and working examples 1 to 11, having tire size 155/55R20, each of the components illustrated in FIG. 1 (except for side reinforcing rubber 28), and satisfying the conditions shown in Table 1-1, 1-2 or 1-3 (total width SW, outer diameter OD, inner diameter ID, the ratio X1/Y1 where X1 is a first region R1 area and Y1 is an inner circumferential surface periphery length, the ratio X2/Y2 where X2 is a second region R2 area and Y2 is an inner circumferential surface periphery length, the ratio X3/Y3 where X3 is a third region R3 area and Y3 is an inner circumferential surface periphery length Y3, the tire maximum thickness position in the first region R1, variation in tire thickness in the fifth region, presence or lack of side reinforcing rubber 22, loss tangent (tan δ) of side reinforcing rubber at 60° C., JIS-A hardness of side reinforcing rubber at 20° C., the ratio TDW/SW where TDW is a developed tread width and SW is a total width SW, and angle θ).

In contrast, a pneumatic tire in a conventional example was manufactured having tire size 205/55R16 and each of the components illustrated in FIG. 1 (except for side reinforcing rubber 28), and satisfying the conditions shown in Table 1-1.

Each of the test tires thus manufactured in the conventional example, comparative examples 1 to 2 and working examples 1 to 11 were evaluated for fuel economy performance, steering stability performance and load durability.

The results are also shown in Table 1-1 to Table 1-3.

(Fuel Economy Performance)

Each test tire was mounted on a rim and installed on a front wheel drive vehicle with 1800 cc displacement volume. After the vehicle was driven around a 2 km test course 50 times at a speed of 100 km/h, the fuel consumption rate was calculated.

Then, using the fuel consumption rate of the conventional example as a reference (100), the fuel economy improvement rate was calculated for each working example.

Higher numerical values indicate higher fuel economy performance.

(Steering Stability)

Each test tire was mounted on a rim and installed on a front wheel drive vehicle with 1800 cc displacement volume. After the vehicle was driven around a 2 km test course three times while changing lanes and received a functional evaluation by three drivers, and the mean value of the evaluation values was calculated.

Then, index evaluation was performed out on the basis of the measured results using the conventional example as a reference (100).

Higher index values indicate better steering stability.

(Load Durability)

Load durability tests specified by JISD-4230 were performed using a drum diameter 1707 mm drum testing machine.

During these tests, load was increased by 20% the maximum load capacity every five hours, and the traveling distance at the point of tire destruction was measured.

Then the endurance improvement rate was calculated on the basis of the measured results using the conventional example as a reference, and index evaluation was performed using the conventional example as a reference (100).

Higher index values indicate better load durability.

The results are shown in Table 1-1, 1-2 and 1-3.

TABLE 1-1

|  | Conventional Example | Working Example 1 | Working Example 2 | Working Example 3 | Working Example 4 |
|---|---|---|---|---|---|
| Ratio SW/OD | 0.33 | 0.24 | 0.24 | 0.24 | 0.24 |
| Ratio ID/OD | 0.64 | 0.74 | 0.74 | 0.74 | 0.74 |
| Ratio X1/Y1 | 11 | 14 | 14 | 20 | 20 |
| Ratio X2/Y2 | 9 | 15 | 15 | 12 | 12 |

TABLE 1-1-continued

|  | Conventional Example | Working Example 1 | Working Example 2 | Working Example 3 | Working Example 4 |
|---|---|---|---|---|---|
| Ratio X3/Y3 | 10 | 10 | 13 | 13 | 13 |
| Tire maximum thickness positions in first regions R1 | Fourth regions R outer | Fourth regions R outer | Fourth regions R outer | Fourth regions R outer | Fourth regions R inner |
| Tire thickness variation in fifth regions R5 (mm) | 3 | 3 | 3 | 3 | 3 |
| Presence of side reinforcing rubber | No | No | No | No | No |
| Loss tangent (tan δ) of side reinforcing rubber at 60° C. | — | — | — | — | — |
| JIS-A hardness of side reinforcing rubber at 20° C. | — | — | — | — | — |
| Ratio TDW/SW | 0.75 | 0.75 | 0.75 | 0.75 | 0.75 |
| Angle θ (°) | 6 | 6 | 6 | 6 | 6 |
| Fuel Economy performance | 100 | 100.3 | 100.3 | 100.3 | 100.3 |
| Steering stability performance | 100 | 105 | 110 | 110 | 110 |
| Load durability | 100 | 110 | 110 | 115 | 117 |

TABLE 1-2

|  | Working Example 5 | Working Example 6 | Working Example 7 | Working Example 8 | Working Example 9 |
|---|---|---|---|---|---|
| Ratio SW/OD | 0.24 | 0.24 | 0.24 | 0.24 | 0.24 |
| Ratio ID/OD | 0.74 | 0.74 | 0.74 | 0.74 | 0.74 |
| Ratio X1/Y1 | 20 | 20 | 20 | 20 | 20 |
| Ratio X2/Y2 | 12 | 12 | 12 | 12 | 12 |
| Ratio X3/Y3 | 13 | 13 | 13 | 13 | 13 |
| Tire maximum thickness positions in first regions R1 | Fourth regions R inner | Fourth regions R inner | Fourth regions R inner | Fourth regions R inner | Fourth regions R inner |
| Tire thickness variation in fifth regions R5 (mm) | 2 | 2 | 2 | 2 | 2 |
| Presence of side reinforcing rubber | No | Present | Present | Present | Present |
| Loss tangent (tan δ) of side reinforcing rubber at 60° C. | 0.12 | 0.08 | 0.08 | 0.08 | 0.08 |
| JIS-A hardness of side reinforcing rubber at 20° C. | — | 0.11 | 0.09 | 0.09 | 0.09 |
| Ratio TDW/SW | 0.75 | 0.75 | 0.75 | 0.9 | 0.9 |
| Angle θ (°) | 6 | 6 | 6 | 6 | 4 |
| Fuel Economy performance | 100.3 | 100.2 | 100.2 | 100.2 | 100.2 |
| Steering stability performance | 110 | 110 | 110 | 110 | 115 |
| Load durability | 120 | 123 | 124 | 125 | 125 |

TABLE 1-3

|  | Working Example 10 | Working Example 11 | Comparative Example 1 | Comparative Example 2 |
|---|---|---|---|---|
| Ratio SW/OD | 0.24 | 0.24 | 0.24 | 0.24 |
| Ratio ID/OD | 0.74 | 0.74 | 0.74 | 0.74 |
| Ratio X1/Y1 | 30 | 14 | 11 | 20 |
| Ratio X2/Y2 | 15 | 15 | 9 | 9 |
| Ratio X3/Y3 | 10 | 15 | 10 | 10 |
| Tire maximum thickness positions in first regions R1 | Fourth regions R outer | Fourth regions R outer | Fourth regions R outer | Fourth regions R outer |
| Tire thickness variation in fifth regions R5 (mm) | 3 | 3 | 3 | 3 |

TABLE 1-3-continued

| | Working Example 10 | Working Example 11 | Comparative Example 1 | Comparative Example 2 |
|---|---|---|---|---|
| Presence of side reinforcing rubber | No | No | No | No |
| Loss tangent (tan δ) of side reinforcing rubber at 60° C. | — | — | — | — |
| JIS-A hardness of side reinforcing rubber at 20° C. | — | — | — | — |
| Ratio TDW/SW | 0.75 | 0.75 | 0.75 | 0.75 |
| Angle θ (°) | 6 | 6 | 6 | 6 |
| Fuel Economy performance | 100.3 | 100.3 | 100.3 | 100.3 |
| Steering stability performance | 110 | 115 | 95 | 110 |
| Load durability | 110 | 110 | 95 | 97 |

According to Table 1-1, 1-2 and 1-3, a pneumatic tire according to working examples 1 to 11 within the technical scope of the present technology (the relationship of total width SW and outer diameter OD, the relationship of inner diameter ID and outer diameter OD, and the shape of prescribed regions in a tire meridian cross-section satisfy prescribed conditions) improves fuel economy performance, steering stability performance, and load durability in a well-balanced manner, better than the pneumatic tire in the conventional example, which is not within the technical scope of the present technology.

On the other hand, the tire in comparative example 1 has the ratio X1/Y1, ratio X2/Y2 and ratio X3/Y3 as the conventional example, and a tire size of 155/55R20, and thus fuel economy performance is improved, but steering stability performance and load durability are decreased.

The tire in comparative example 2 only had a ratio X1/Y1 greater than the conventional example, and thus had insufficient improvement effects for load durability.

The invention claimed is:

1. A pneumatic tire comprising:
a carcass layer toroidally bridging a pair of bead portions and a tread portion via a pair of sidewall portions;
a total width SW and an outer diameter OD satisfying the relationship SW/OD<0.3;
an inner diameter ID and the outer diameter OD satisfying the relationship ID/OD>0.7;
in a tire meridian cross-section, on each side in the tire width direction with the tire equatorial plane in-between, an imaginary pair of first boundary lines passing through the intersection of an extension line of a shoulder arc and an extension line of a side arc and perpendicular to the tire inner circumferential surface, and an imaginary pair of second boundary lines passing through a rim checking line and perpendicular to the tire inner circumferential surface;
regions between the first boundary lines and the second boundary lines being respective first regions, and regions further inside from the second boundary lines in the tire radial direction being respective second regions;
the area X1 (mm$^2$) of the first region and the periphery length Y1 (mm) of the inner circumferential surface of the first region having a ratio X1/Y1 of 12 or greater and 30 or less;
the area X2 (mm$^2$) of the second region and the periphery length Y2 (mm) of the inner circumferential surface of the second region having a ratio X2/Y2 of 10 or greater and 15 or less;
reference points being the intersections of the first boundary lines on the both sides in the tire width direction and a profile line of the tire outer circumferential surface, and a developed tread width TDW being the length along the profile line between the two reference points;
a tread apex being an intersection of the profile line and tire equatorial plane, and an angle θ being an angle of a line segment joining the reference point and the tread apex relative to the tire width direction; the developed tread width TDW and a total width SW having a ratio TDW/SW of 0.8 or greater and 1 or less; and
the angle θ being 1° or greater and 5° or less.

2. A pneumatic tire according to claim 1, wherein the region between the pair of first boundary lines being a third region, for the area X3 (mm$^2$) of the third region and the periphery length Y3 (mm) of the inner circumferential surface of the third region, a ratio X3/Y3 is 11 or greater and 15 or less.

3. A pneumatic tire according to claim 1, wherein the ratio X1/Y1 is greater than the ratio X2/Y2.

4. A pneumatic tire according to claim 1, wherein in a tire meridian cross-section, a tread apex being the intersection of a profile line of a tire outer circumferential surface and a tire equatorial plane, an imaginary pair of third boundary lines orthogonal to the tire inner circumferential surface and passing through respective positions on the tire outer circumferential surface at a distance 0.25 times the tire cross-sectional height from the tread apex, each fourth region being a region between the second boundary line and the third boundary line, a tire maximum thickness position in the first region is present in the fourth regions.

5. A pneumatic tire according to claim 1, wherein in a tire meridian cross-section, a tread apex being the intersection of a profile line of a tire outer circumferential surface and a tire equatorial plane, an imaginary pair of fourth boundary lines orthogonal to the tire inner circumferential surface and passing through respective positions on the tire outer circumferential surface at a distance 0.5 times the tire cross-sectional height from the tread apex, each fifth region being a region between the first boundary line and the fourth boundary line, a variation of the tire thickness in the fifth region is 2 mm or smaller.

6. A pneumatic tire according to claim 1, wherein
in a tire meridian cross-section, crescent-shaped side reinforcing rubber is arranged inside in the tire width direction of the carcass layer.

7. A pneumatic tire according to claim 6, wherein
the loss tangent (tan δ) of the side reinforcing rubber at 60° C. is 0.01 or greater and 0.1 or less.

8. A pneumatic tire according to claim 6, wherein
the JIS-A hardness of the side reinforcing rubber at 20° C. is 60 or greater and 80 or less.

* * * * *